Aug. 25, 1953         R. N. BAUGH              2,649,783
                      CENTER FINDER
                    Filed June 27, 1950
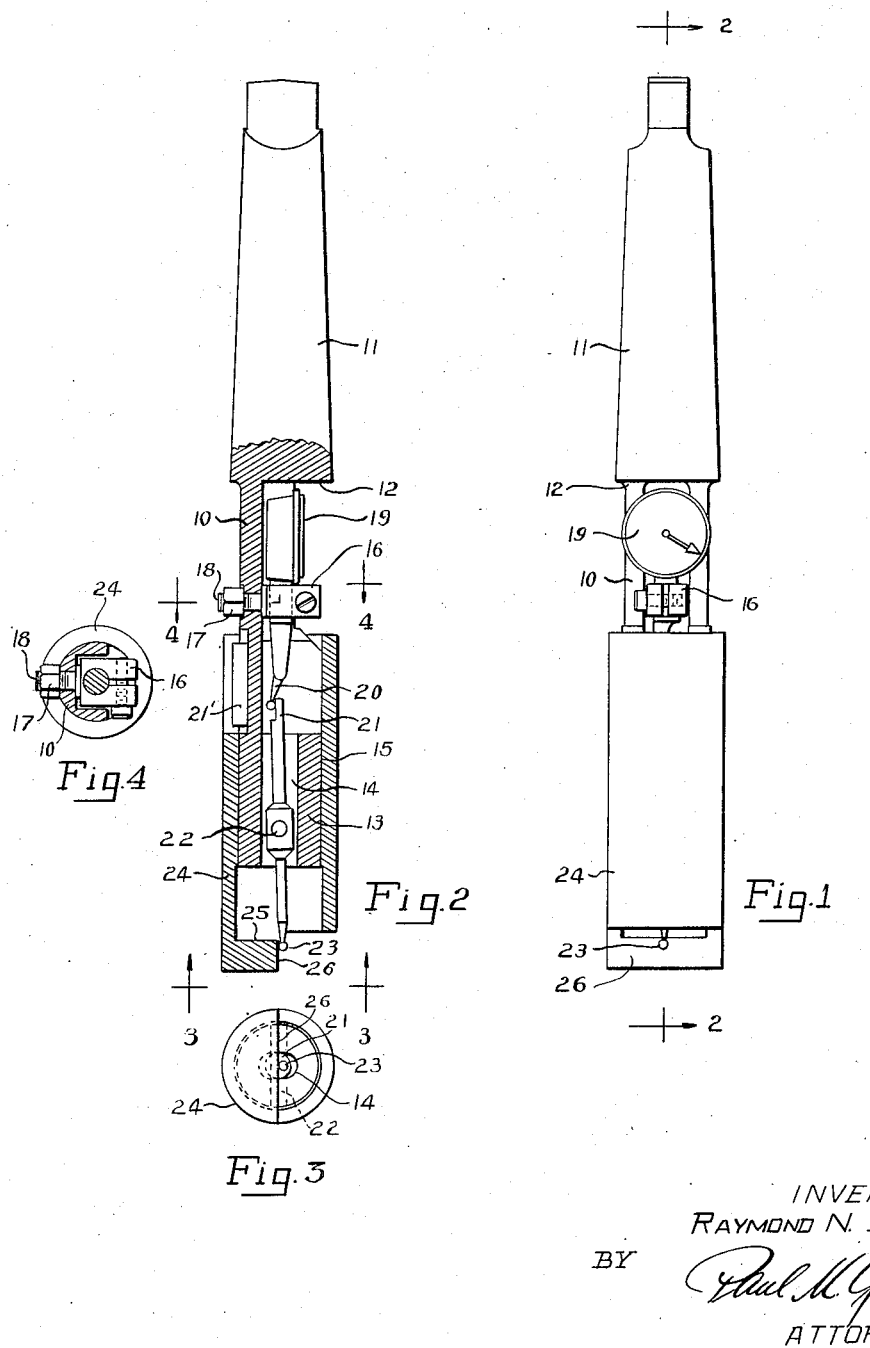
INVENTOR
RAYMOND N. BAUGH
BY
ATTORNEY Patented Aug. 25, 1953

2,649,783

UNITED STATES PATENT OFFICE 2,649,783

CENTER FINDER

Raymond N. Baugh, Bridgeport, Conn.

Application June 27, 1950, Serial No. 170,510

5 Claims. (Cl. 33—172)

This invention relates to indicators, and particularly to a new and improved device for accurately locating the center of a machine tool spindle in relation to a work piece.

In every case where it is desired to perform one or more operations on work by a tool held in a machine tool spindle, it is necessary initially to accurately locate the center of the spindle relatively to a datum on the work piece from which layout dimensions are measured. Many attempts have been made, heretofore, to devise apparatus for accomplishing this result, and certain of these devices have met with some success. Usually, however, such prior-known devices are relatively complicated and possess questionable accuracy.

The principal object of this invention is to provide an instrument that will be inexpensive to manufacture and still possess the necessary accuracy in locating machine tool centers relatively to a work piece.

Other objects include the provision of a machine tool center finder that includes a pre-settable means for indicating the axial centerline of the spindle with which it is employed; the provision of such a center finder in which the pre-settable means is not employed during the actual center-finding operation; and the provision of such a center finder that is accurate in operation and inexpensive in construction.

The above, as well as other objects and novel features of the improved center finder will become apparent from the following specification and accompanying drawing in which:

Figure 1 is an elevational view of the assembled device embodying the principles of the invention;

Fig. 2 is a sectional elevational view taken substantially along line 2—2 of Fig. 1;

Fig. 3 is an end view of the device of Figs. 1 and 2; and

Fig. 4 is a sectional view taken substantially along line 4—4 of Fig. 2.

Referring to Figs. 1 and 2, the principles of the invention are shown as applied to a tool member including a body portion 10 having a standard tapered shank portion 11 adapted to be received within a spindle (not shown), the center of which is desired to be located accurately relatively to a piece of work. The body portion 10 is recessed at 12 to receive an indicator for a purpose to be described later, and is provided with a cylindrical lower portion 13 having a central bore 14 therethrough. While the axial alignment of bore 14 with respect to the longitudinal axis of the shank 11 is not critical, the outer peripheral surface 15 of the portion 13 must have its longitudinal axis coaxial with that of the shank 11.

An indicator clamp 16 is fixed to the body 10 by a nut 17 that is screwed onto a threaded shank 18 of the clamp 16. An indicator 19 of any desired commercial type is rigidly, but removably held in the clamp 16 in position such that the operating finger 20 is located in position to be contacted by one end of a lever 21 pivoted on a pin 22 extending through the cylindrical portion 13 of the body 10. The lower end of lever 21 is provided with a ball point 23 for contacting the work, or a datum with respect to which the center of the spindle is to be accurately located.

As previously indicated, the outer periphery of the cylindrical portion 13 is very accurately machined so that the longitudinal axis thereof is in perfect coaxial relation with that of the tapered shank 11. A sleeve 24 having an accurate bore is adapted to be removably slid over the cylindrical portion 13 for pre-setting the dial of the indicator 19. The sleeve includes a partially-closed lower end 25 having a surface 26 accurately machined to lie in the plane passing along the longitudinal axis of the bore of the sleeve 24. A key 21' is provided between the body 13 and the sleeve 24 so that surface 26 is always located in the same angular relation with respect to the longitudinal axis of shank 11. Accordingly, it is only necessary to slide the sleeve 24 over the cylindrical portion 13, and with the ball point 23 pressing against the surface 26, the indicator 19 is set to zero. The sleeve 24 is then removed and the shank 11 is forced into the spindle to be located. Relative movement is then effected between the work and spindle until a known datum on the work is contacted by the ball point 23, and the lever 21 pivoted until the indicator reading is zero. When this occurs, the center of the spindle will be directly over the datum of the work from which any desired position of the spindle relatively to said datum can accurately be established by employing the well-known "Jo-blocks" and the like.

Although the various features of the improved center finder have been shown and described in detail to fully disclose one embodiment of the invention, it will be evident that numerous changes may be made in such details, and certain features may be used without others, without departing from the principles of the invention.

What is claimed is:

1. A tool center finder comprising in combination, a body member including a shank adapted to be received by a hollow spindle; clamp means on said body member adapted to hold a pre-settable indicator; a pre-settable indicator in said clamp means; a pivotally-mounted finger adapted to cooperate with said indicator and means that is to be aligned with the axial centerline of said spindle; and means separate from said finger means adapted to cooperate with said body member and said finger means for facilitating the pre-setting of said indicator relatively to the centerline of said body member.

2. A tool center finder comprising in combination, a body member including a tapered shank; a cylindrical portion having the longitudinal axis of its outer periphery coaxial with that of said shank; a pre-settable indicator clamped to said body portion; a sleeve adapted to register with said outer periphery of said cylindrical portion and including a surface within a plane including the longitudinal axis of said sleeve; and a finger pivoted on said body member and adapted to cooperate with said sleeve and said indicator for accurately pre-setting said pre-settable indicator.

3. In a center finder, a body including a shank adapted to be received in a hollow spindle of a machine tool; a clamp associated with said body member; a pre-settable indicator held by said clamp; means fixed to said body having a cylindrical outer surface, the longitudinal axis of which is coaxial with that of said shank; a pivoted lever associated with said means and adapted to cooperate with the indicator held by said clamp; and a sleeve having a bore adapted to cooperate with said cylindrical outer surface and having a surface adapted when said cooperation exists to lie in the plane passing along the single longitudinal axis of said shank and means, said surface being employed to pre-set said indicator by cooperation with said pivoted lever.

4. A non-rotatable center finder comprising in combination, a body having a shank adapted to be mounted in a hollow spindle of a machine tool; a clamp for removably holding a pre-settable indicator on said body; a multiplying lever associated with said body member for cooperation with said indicator and a datum; and means separate from, but cooperable with said body member including said datum and adapted to cooperate with said multiplying lever for facilitating the setting of said indicator to zero when the one end of said multiplying lever is in the plane passing along the longitudinal axis of said shank.

5. A non-rotatable center finder according to claim 4 in which said means includes a sleeve having portions adapted to cooperate with said multiplying lever and said body.

RAYMOND N. BAUGH.

References Cited in the file of this patent

UNITED STATES PATENTS

| Number | Name | Date |
|---|---|---|
| 672,213 | Holcomb | Apr. 16, 1901 |
| 1,295,982 | Hanton | Mar. 4, 1919 |
| 1,723,529 | Schwieterman | Aug. 6, 1929 |
| 2,074,990 | Roberts | Mar. 23, 1937 |
| 2,076,819 | Jones | Apr. 13, 1937 |
| 2,098,838 | Rusnak | Nov. 9, 1937 |
| 2,115,955 | Johnson | May 3, 1938 |
| 2,173,519 | Jones | Sept. 19, 1939 |
| 2,533,198 | Radtke | Dec. 5, 1950 |